O. Osmundson,

Bee Hive.

No. 89,067. Patented Apr. 20, 1869.

Witnesses
C. Hord
Chas. A. Wilcox

Inventor.
Ole Osmundson

OLE OSMUNDSON, OF MISSION, ILLINOIS.

Letters Patent No. 89,067, dated April 20, 1869.

IMPROVEMENT IN BEE-HIVES.

The Schedule referred to in these Letters Patent and making part of the same.

*To all whom it may concern:*

Be it known that I, OLE OSMUNDSON, of the town of Mission, in the county of La Salle, and State of Illinois, have invented a new and improved Bottom for Bee-Hives; and I do hereby declare that the following is a full, clear, and exact description of the same, reference being had to the accompanying drawings, forming a part of this specification, in which—

Figure 1:
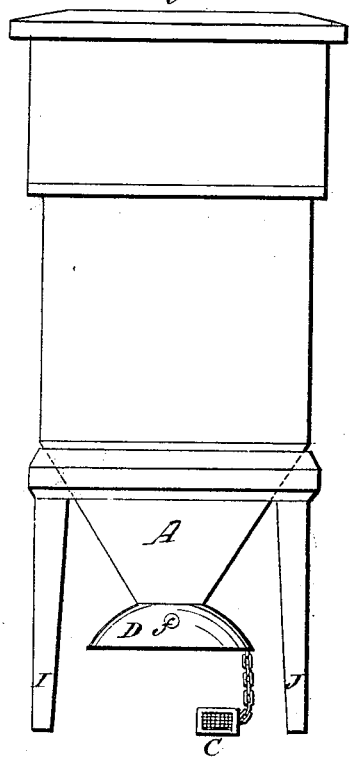
Figure 2:
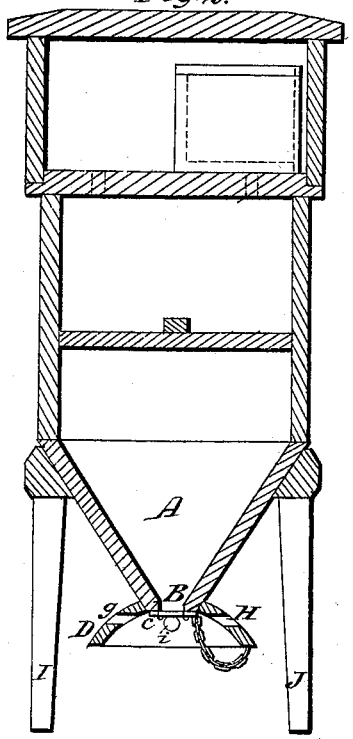
Figure 3:
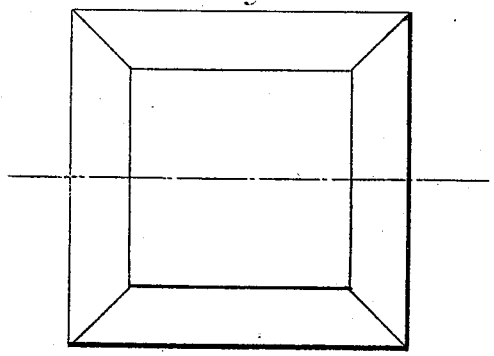

Figure 1 is an elevation of one side of a bee-hive, with my improvements attached thereto;

Figure 2, a central vertical section of the same;

Figure 3, a plan or top view of fig. 1; and

Figure 4:
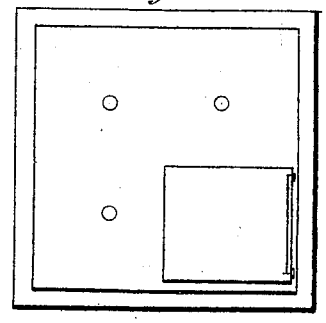

Figure 4, a plan of the upper section of hive.

Similar letters of reference denote like parts in all of the figures.

The nature of my invention consists in the construction and arrangement of a hopper-bottom for bee-hives, the orifice of which is regulated by an adjustable sieve, sliding on ways on the inner sides of an alighting-board, the outer and inner sides of which are semispherical, and provided with apertures, for the ingress and egress of the bees.

The hopper A is centrally suspended, in a square frame, supported by four legs, I J, and the hive secured to its upper face, as shown in fig. 2 of the drawings.

The lower part of the hopper is provided with an opening, B, the size of which is regulated by means of a sieve, fitted within a metallic frame, $c$, and arranged to slide on ways, or guides secured to the inner sides of the alighting-board D.

The vertical aperture B is centrally located in the bottom of hopper A, and the apertures $f\ g\ h\ i$ in the alighting-board are made thereto at such an angle, as that the bees may, on entering any one of said apertures, crawl around on the inner periphery of the alighting-board to the aperture B, the inner surface of board D serving as a bridge from each of the orifices $f\ g\ h\ i$, to the main entrance B.

By adjusting the frame $c$, the aperture B may be made just large enough for the ingress and egress of the working bees, and yet not large enough to allow the escape of the queen bee, the sieve within frame $c$ being used for the admission of pure air, to properly ventilate the hive.

The sieve-frame $c$ may be secured by a small chain, or cord, to the lower edge of the board D, and adjusted or removed at will, by placing the hand up under the board D, which, by reason of its open bottom, admits of seeing to the proper adjustment of the sieve $c$.

The tapering sides of the hopper-bottom serve to convey the worms and dead bees to the aperture B, where they fall out, thus saving the bees the labor of their removal, and thereby securing cleanliness and purity of both hive and honey.

Having thus fully described my invention,

What I claim therein as new, and desire to secure by Letters Patent, is—

The combination of hopper A, aperture B, sieve $c$, alighting-board D, and apertures $f\ g\ h\ i$, when constructed and arranged substantially in the manner and for the purpose herein set forth.

OLE OSMUNDSON.

Witnesses:
C. HUNT,
CHAS. A. WILCOX.